(No Model.)
L. C. PRATT.
CLUTCH.
No. 290,706.  Patented Dec. 25, 1883.
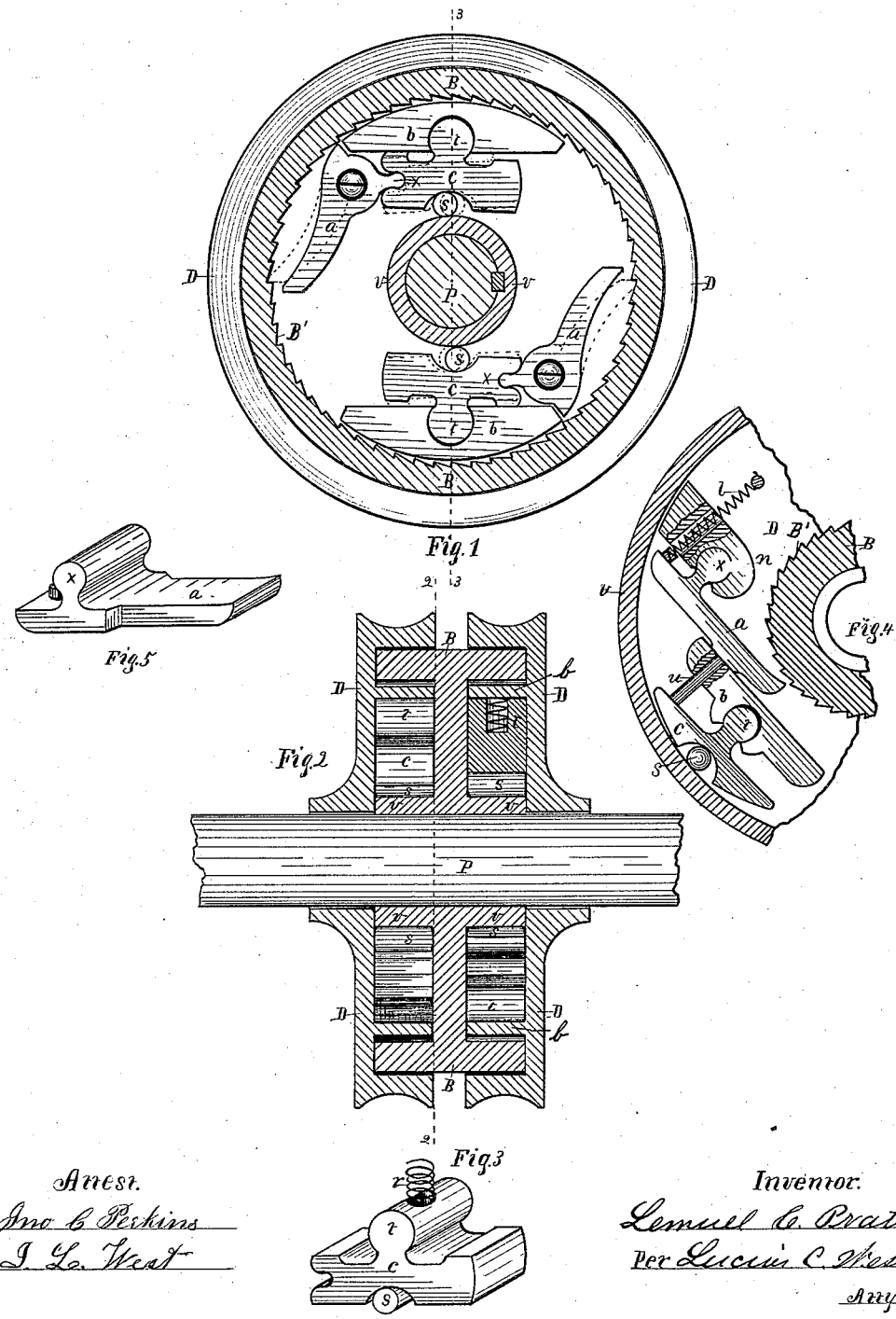
Attest.
Jno. C. Perkins
J. L. West
Inventor.
Lemuel C. Pratt
Per Lucius C. West
Atty

UNITED STATES PATENT OFFICE.

LEMUEL C. PRATT, OF KALAMAZOO, MICHIGAN.

CLUTCH.

SPECIFICATION forming part of Letters Patent No. 290,706, dated December 25, 1883.

Application filed November 3, 1883. (No model.)

*To all whom it may concern:*

Be it known that I, LEMUEL C. PRATT, a citizen of the United States, residing at Kalamazoo, county of Kalamazoo, State of Michigan, have invented a new and useful Clutch, of which the following is a specification.

The object of my invention is to construct an improved clutch, whereby a more prompt and a comparatively noiseless movement of parts are attained and the operation otherwise greatly facilitated.

In the drawings forming a part of this specification, Figure 1 shows a plan of the clutch mechanism, with portions in section on line 2 2 in Fig. 2. Fig. 2 is a section on line 3 3 in Fig. 1, portions being left full; Fig. 3, a detached part in perspective; Fig. 4, a broken portion of an equivalent construction to that shown in Fig. 1, and Fig. 5 a detached part of Fig. 4 in perspective.

The disk B has a hub, $v\ v$, integrally formed therewith, which is keyed or otherwise secured to the axle P. This disk has a wide rim, forming circular recesses between said rim and hub to contain the clutch mechanism. The inner surface of this rim is serrated, forming a ratchet, B', in conjunction with pawls $a\ a$. Disks D are revolubly located on the axle P, forming one inclosure to the recesses of disk B. The periphery of the disks D may be formed to serve as pulleys or gears, adapted either to receive or transmit motion from other devices. The disks D are provided with blocks $b$, having rounded pockets to loosely receive the rounded bearings $t$ of the rocking levers $c$. These rocking levers have a rounded pocket to loosely receive the rounded bearings $x$ of the pivoted pawls $a\ a$. A friction-roller, $s$, is located in an elongated pocket of the rocking lever $c$, and is adapted to engage the periphery of hub $v$. The bearing $t$ of the rocking lever $c$ is provided with a pocket-containing spring, $r$, Fig. 3. This spring, pressing against the block $b$, compensates any looseness or wear of parts, and causes a yielding engagement of the parts with the friction-roller $s$. One or more clutch devices may be located in the disks B. In Fig. 1 two are shown.

In the operation as illustrated in Fig. 1 the axle P, revolving toward the left, carries the friction-rollers $s$ along in their pockets until they wedge between the hub $v$ and the wall of said pockets. Said action at this time has rocked the rocking lever and thrown the pawls $a\ a$ from engagement with the ratchet B', as indicated by the dotted positions of the parts. A reverse revolution of the axle P throws the rollers $s$ to opposite end of their pockets, rocking the levers $c$ the other way, and thus causing the pawls to engage the ratchet. At this time the stop $e$ of the pawl $a$ hits the end of block $b$. This relieves the rocking lever and pawl-pivot of a portion of the strain on said parts.

In Fig. 4 the ratchet B' is located around the axle or hub, and the inner surface of the rim of disk B is left smooth, thus reversing the order of the clutching parts, making what I consider an equivalent construction. The position of the rocking lever $c$, roller $s$, bearing-block $b$, and pawl $a$ are changed to conform to the reverse order above named. The action of the roller $s$ on the rim in Fig. 4 has the same effect on the pawl $a$ in its relation to the ratchet B' as the action of said roller on the hub $v$ has in Fig. 1. The pawl $a$ has bearings in block $n$ in Fig. 4, and connection is made between the pawl and the rocking lever $c$ by a bar, $u$. A spring, $l$, may be used to facilitate the action of the pawl $a$.

Having described my invention, what I consider as new, and desire to protect by Letters Patent, is—

1. The combination, with the revoluble disk having the bearing-block, the recessed disk having the flanged rim and hub, and provided with a ratchet, of the rocking lever, pivoted pawl, and friction-roller, all substantially as set forth.

2. The combination, with the revoluble disk having a bearing-block with pocket, and the recessed disk having a ratchet-surface, of the rocking lever, friction-roller, and a pawl pivoted and having bearings in the rocking lever, and provided with the stop projection, substantially as described and shown.

3. The combination of the bearing-block having a rounded pocket, a rocking lever with pressure-spring, a pawl, and a ratchet, substantially as set forth.

4. In a clutch device, the combination, with a pawl and a rocking lever adapted to operate said pawl, and provided with a friction-roller pocket, of a friction-roller adapted to rock said lever by frictional contact with a revolving surface, substantially as set forth.

In testimony of the foregoing I have hereunto subscribed my name in the presence of two witnesses.

LEMUEL C. PRATT.

Witnesses:
  LEON KEWNEY,
  CHARLES LEVY.